United States Patent
Patton, Jr. et al.

(10) Patent No.: US 9,892,080 B2
(45) Date of Patent: Feb. 13, 2018

(54) RECEIVE MODE UPON EXPIRATION OF UART TRANSMIT START BIT DELAY

(71) Applicant: TEXAS INSTRUMENTS INCORPORATED, Dallas, TX (US)

(72) Inventors: Schuyler T. Patton, Jr., Dallas, TX (US); Punya Prakash, Dallas, TX (US); Melissa Marie Watkins, Dallas, TX (US); Saqib Nadeem Mohammad, Sandy Springs, GA (US); Bradley James Griffis, Schaumburg, IL (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/967,959

(22) Filed: Dec. 14, 2015

(65) Prior Publication Data

US 2016/0098373 A1    Apr. 7, 2016

Related U.S. Application Data

(62) Division of application No. 14/311,355, filed on Jun. 23, 2014, now Pat. No. 9,246,534.

(60) Provisional application No. 61/941,922, filed on Feb. 19, 2014.

(51) Int. Cl.
| | |
|---|---|
| *H04B 1/38* | (2015.01) |
| *G06F 13/40* | (2006.01) |
| *H04L 5/16* | (2006.01) |
| *H04B 1/401* | (2015.01) |
| *H04B 1/48* | (2006.01) |

(Continued)

(52) U.S. Cl.
CPC ...... *G06F 13/4072* (2013.01); *G06F 13/4282* (2013.01); *H04B 1/401* (2013.01); *H04B 1/48* (2013.01); *H04B 1/54* (2013.01); *H04L 5/16* (2013.01)

(58) Field of Classification Search
CPC ........ G05B 19/042; G05B 2219/25451; G05B 2219/15018; G06F 13/385; G06F 21/606; G06F 21/85
USPC ....................................................... 375/219
See application file for complete search history.

(56) References Cited

U.S. PATENT DOCUMENTS 4,761,763 A * 8/1988 Hicks .................. H04L 25/40
                                                    710/106
5,199,105 A * 3/1993 Michael ................ G06F 13/38
                                                    710/22

(Continued)

FOREIGN PATENT DOCUMENTS

| CN | 1389800 A | 1/2003 |
| EP | 0878923 A2 | 11/1998 |

(Continued)

OTHER PUBLICATIONS

Search Report, PCT/US2015016512, dated Jul. 21, 2017.

*Primary Examiner* — Don N Vo
(74) *Attorney, Agent, or Firm* — Lawrence J. Bassuk; Charles A. Brill; Frank D. Cimino

(57) ABSTRACT

Signaling to control transmit/receive mode transitions of a serial half-duplex transceiver coupled externally to an integrated circuit is provided by the integrated circuit separately from a host processor of the integrated circuit with which the transceiver communicates. This can avoid slow transceiver turn-around times that may be associated with host processor control of the mode transitions.

4 Claims, 3 Drawing Sheets

(51) Int. Cl.
*H04B 1/54* (2006.01)
*G06F 13/42* (2006.01)

(56) References Cited

U.S. PATENT DOCUMENTS

| | | | | |
|---|---|---|---|---|
| 5,315,622 A | * | 5/1994 | Abbiate | H04L 27/24 375/354 |
| 5,964,853 A | * | 10/1999 | Falik | G06F 13/124 710/49 |
| 2001/0050905 A1 | * | 12/2001 | Shin | G06F 13/385 370/296 |

FOREIGN PATENT DOCUMENTS

| | | |
|---|---|---|
| WO | 8700713 A1 | 1/1987 |
| WO | 9742730 A1 | 11/1997 |
| WO | 0241086 A2 | 5/2002 |
| WO | 03088568 A2 | 10/2003 |

* cited by examiner

RECEIVE MODE UPON EXPIRATION OF UART TRANSMIT START BIT DELAY

This Application is a Divisional of prior application Ser. No. 14/311,355, filed Jun. 23, 2014, now U.S. Pat. No. 9,246,534, issued Jan. 26, 2016;

Which claims the priority under 35 U.S.C. §119(e)(1) of Provisional Application No. 61/941,922 filed Feb. 19, 2014 and incorporated herein by reference.

FIELD

The present work relates generally to communication by an integrated circuit and, more particularly, to control of serial half-duplex communication by an integrated circuit.

BACKGROUND

Serial communication is common in industrial control applications. For example, serial half-duplex communication in accordance with RS-485 is widely used in automation systems. Applications such as factory automation systems often employ programmable logic controllers that use RS-485 for communication. Some systems are moving to Ethernet based communication, but still require support for prevalent legacy systems. RS-485, for example, does not specify speed, format and protocol of the serial communication. Interoperability of even similar devices from different manufacturers is not assured by merely complying with the signal level specifications.

An example of a prior art communication system using serial half-duplex communication is illustrated diagrammatically in FIG. 1, wherein an integrated circuit 10 (e.g., a RISC microprocessor), including a host processor 11 and a universal asynchronous receiver/transmitter (UART) 12, cooperates with an external transceiver (XCVR) 13, for example, a further integrated circuit. The UART 12 outputs to the transceiver 13 data TXD, which has been received from the host processor 11 and is transmitted by the transceiver onto a devices bus that has one or more connected devices, as illustrated diagrammatically at 14. Similarly, the UART 12 receives from the transceiver 13 data RXD, which has been received by the transceiver 13 from the devices bus 14. The UART 12 provides this received data to the host processor 11. The host processor 11 provides to the transceiver 13 control signaling TX/RX that appropriately enables and disables transmit operation and receive operation of the transceiver 13.

A turn-around operation occurs when the host processor 11 (using the TX/RX signal) switches the transceiver 13 from a transmit (TX) mode to a receive (RX) mode, or vice versa. Turn-around time for transition from TX mode to RX mode, for example, is the time required to transition the transceiver 13 from the TX mode, where transmit and receive operations of the transceiver 13 are respectively enabled and disabled, to the RX mode, where transmit and receive operations of the transceiver 13 are respectively disabled and enabled. This turn-around time begins when the last transmitted bit has completely traversed the transceiver 13.

For communication in many automation system applications, low latency, even aggressively low latency, is important. This means, for example, that the turn-around from TX mode to RX mode should happen as soon as possible after the last transmitted bit has traversed the external transceiver (e.g., 13 in FIG. 1). That is, the turn-around time from TX mode to RX mode should be as short as possible.

It is desirable in view of the foregoing to provide for reducing turn-around times between the TX and RX modes of a serial half-duplex transceiver coupled externally to an integrated circuit.

DETAILED DESCRIPTION

Figure 1:
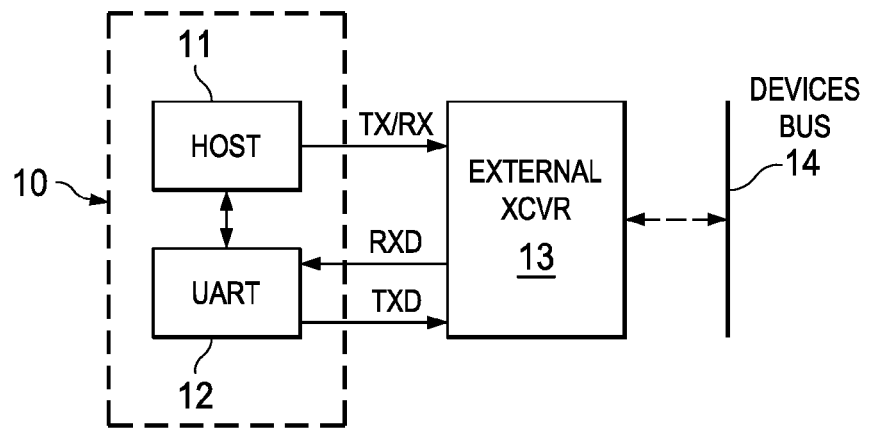
FIG. 1 diagrammatically illustrates a prior art communication system using serial half-duplex communication.

The present work recognizes that, depending on the software used in the host processor (such as shown at 11 in FIG. 1), the turn-around time associated with, for example, a transition from the TX mode to the RX mode of an external serial half-duplex transceiver (such as shown at 13 in FIG. 1) could have a negative impact on the receive capability of the communication link. If the turn-around time is too long, some of the incoming RX data will be missed. Some link protocols require the turn-around operation to occur within two bit times. As an example, for communication at 115.2 k baud, a turn-around time of two bit times would be well within the commonly requested 130 us.

Example embodiments of the present work provide for controlling TX/RX mode transitions of the external transceiver separately from the host processor, thereby to avoid slow turn-around times that may be associated with host processor control of the TX/RX mode transitions. Some embodiments provide, on the same integrated circuit as the host processor, logic that is separate from the host processor and controls the TX/RX mode transitions.

Figure 2:
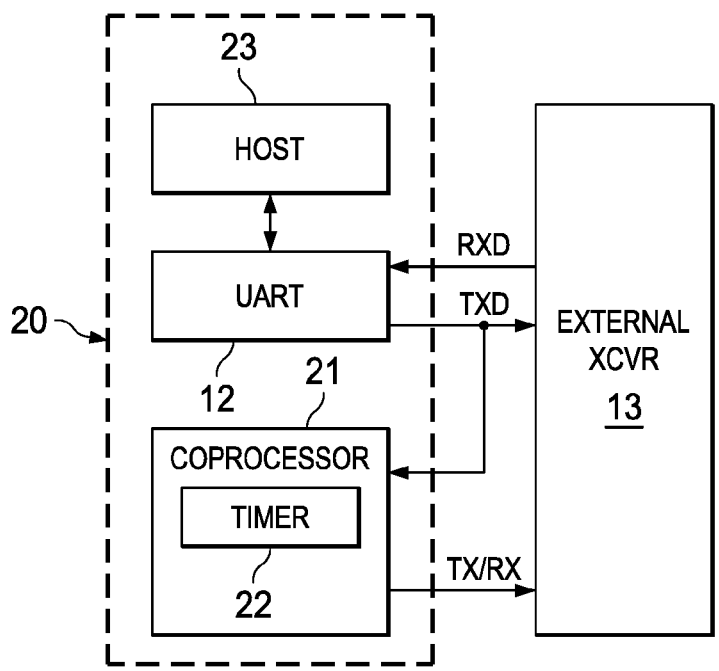
FIG. 2 diagrammatically illustrates a communication system according to example embodiments of the present work.

FIG. 2 diagrammatically illustrates a communication system according to example embodiments of the present work. The system of FIG. 2 is similar to that of FIG. 1 in that a serial half-duplex UART 12 within an integrated circuit 20 interfaces communications between a host processor 23 of the integrated circuit 20 and an external transceiver 13 (an integrated circuit in some embodiments) that is coupled in turn to a devices bus (not explicitly shown in FIG. 2). However, in the system of FIG. 2, a coprocessor 21 (conventionally present in integrated circuits such as 10 and 20 in FIGS. 1 and 2) is used to control transitions between the TX and RX modes of the transceiver 13. Thus, the host processor 23 of FIG. 2 does not control the TX/RX mode transitions, whereas the host processor 11 of FIG. 1 does control those transitions.

The coprocessor 21 controls the TX/RX mode transitions by exploiting knowledge of the timing and structure of serial data frames (also referred to as characters) transmitted at TXD by the UART 12. For example, frames transmitted at TXD typically begin with a start bit that is followed by a predetermined number of data bits (and one or more parity bits in some embodiments), which are in turn followed by one or more stop bits (typically one stop bit). In some embodiments, the frame contains eight data bits. The coprocessor 21 is coupled to the TXD output of the UART 12, and monitors the transmitted frame. Based on this monitoring of the transmitted frame, the coprocessor 21 outputs to the transceiver 13 signaling at TX/RX to indicate selection of the TX mode of the transceiver 13.

In the aforementioned frame monitoring, the coprocessor 21 monitors the TXD output of the UART 12 to detect occurrence of a start bit. Detection of the start bit triggers the coprocessor 21 to signal (at TX/RX) immediately for the TX mode of the transceiver 13 (e.g., TX enabled and RX disabled). In some embodiments, the TX or RX mode is selected by simply toggling a single digital signal that, depending on its logic level, enables TX while disabling RX, or vice versa. Detection of the start bit also triggers operation of a timer function at 22 in coprocessor 21. The total amount of time required to transmit a frame, which includes a start bit, a plurality of data (and optional parity) bits, and a stop bit, is known to the coprocessor 21. When triggered by start bit detection, the timer function 22 begins timing the frame transmission. When the timer function 22 indicates that the frame transmission time has elapsed, the coprocessor 21 signals the transceiver 13 for selection of the RX mode.

In some embodiments, the timer function 22 implements a delay time immediately after the frame transmission time has elapsed. The coprocessor 21 waits until the delay time expires, and then signals for the RX mode. The delay time helps ensure that the stop bit has completely traversed the transceiver 13 before the switch to RX mode occurs. In addition, the coprocessor 21 continues to monitor the TXD output of the UART 12 during the delay time, thereby to avoid unnecessary toggling of the TX/RX select signal between frames in the event that a burst of consecutive frames is transmitted. That is, the start bit of a second (or other subsequent) frame in a burst may be detected during the delay time, causing TX mode to remain selected. This operation can avoid a situation where (1) a switch to RX mode occurs after completion of a frame in a burst, followed by (2) a switch right back to TX mode when the start bit of the next frame of the burst is detected. In various embodiments, the delay has various time durations, for example, at least one bit transmission time (bit time), some fraction of a bit time, and combinations of at least one bit time and some fraction of a bit time.

In various embodiments, firmware for the coprocessor 21 provides configuration parameters including one or more of the total transmission time for a frame, the bit time (typically the same for all bits of a frame), the frame structure, and the delay time. In some embodiments, the use of the delay is an option. In such optional delay embodiments, the delay time parameter can be zero if the no-delay option is in effect.

It will be appreciated by workers in the art that the above-described use of the coprocessor 21 frees the host processor 23 from the task of switching the TX/RX mode of the transceiver 13. This is in contrast with prior art arrangements such as described above relative to FIG. 1, wherein the host processor performs the task of switching the TX/RX mode. The mode control by coprocessor 21 helps to avoid occurrences of excessive turn-around times that may be associated with host processor control.

Figure 3:
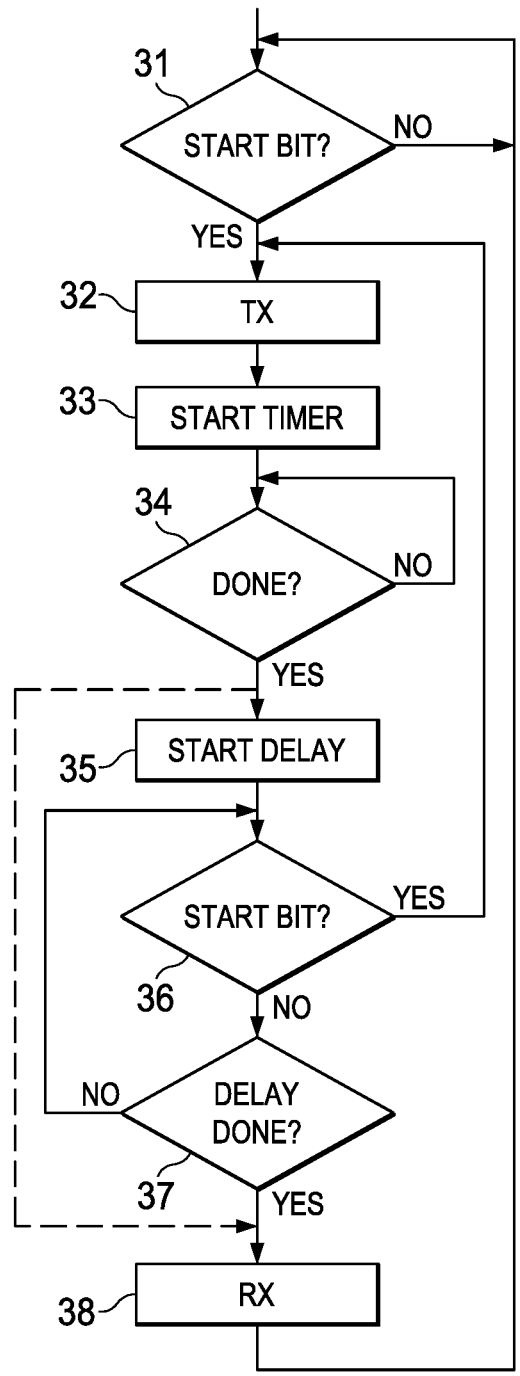
FIG. 3 illustrates operations that may be performed by the system of FIG. 2.

FIG. 3 illustrates operations that may be performed according to example embodiments of the present work. In some embodiments, the system of FIG. 2 is capable of performing the operations of FIG. 3. At 31, there is shown monitoring for a start bit. If a start bit is detected at 31, the TX mode is selected at 32, and a timer function begins at 33. When the timer expires at 34, a delay begins at 35. As shown at 36 and 37, monitoring for a start bit occurs at 36 during execution of the delay. If a start bit is detected at 36, operation proceeds to 32 where TX mode remains selected. If the delay time expires at 37 without detection of a start bit at 36, the RX mode is selected at 38, after which the next start bit is awaited at 31. As indicated earlier, some embodiments do not implement the delay, while others implement it as an option. The broken line in FIG. 3 illustrates operation in no-delay embodiments, and in optional delay embodiments where the no-delay option is in effect. In both cases, the RX mode is selected at 38 immediately upon expiration of the timer at 34 as shown.

Figure 4:
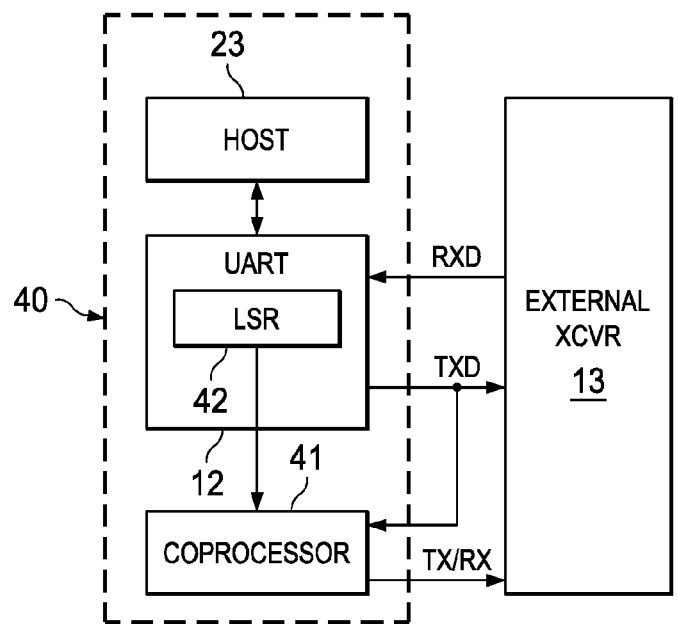
FIG. 4 diagrammatically illustrates a communication system according to further example embodiments of the present work.

FIG. 4 diagrammatically illustrates a communication system according to further example embodiments of the present work. The system of FIG. 4 is generally similar to that of FIG. 2, except a coprocessor 41 within the integrated circuit 40 utilizes a line status register (LSR) 42 (conventionally available in the UART 12) to track progress of frame transmission on the TXD output of the UART 12. The LSR 42 conventionally indicates when transmit hold and shift registers of the UART 12 are empty, which is an indication that transmission of the frame is complete.

Figure 5:
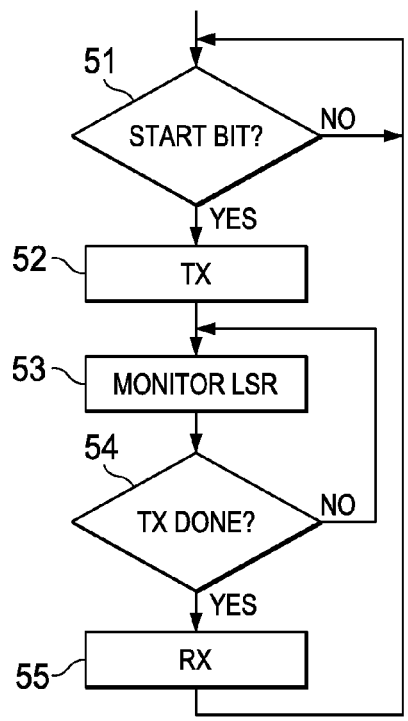
FIG. 5 illustrates operations that may be performed by the system of FIG. 4.

FIG. 5 illustrates further operations that may be performed according to example embodiments of the present work. In some embodiments, the system of FIG. 4 is capable of performing the operations of FIG. 5. At 51, there is shown monitoring for a start bit. If a start bit is detected at 51, the TX mode is selected at 52, and the LSR is monitored starting at 53. When the LSR indicates at 54 that transmission is complete, the RX mode is selected at 55, after which the next start bit is awaited at 51.

It will be appreciated by workers in the art that the techniques described above relative to FIGS. 2-5 are easily scalable to accommodate multiple UARTs 12 in each of the integrated circuits 20 and 40, with multiple external transceivers 13 respectively coupled to the multiple UARTs. Such multiple UART/XCVR combinations are typically the case, for example, in factory automation applications. The firmware for the coprocessor 21 or 41 provides configuration parameters to identify, for each of the multiple UART/XCVR combinations, which terminals of the integrated circuit are to be used by the coprocessor to monitor the TXD output of the associated UART 12, and to output the TX/RX signal to the associated XCVR 13.

No interrupt processing is required on the host processor for TX/RX mode control in the above-described embodiments, so there is no impact on the host UART driver software operation. The firmware for the coprocessor may be loaded in conventional fashion by the host processor (e.g., a Linux or RTOS host processor driver) written for the operating system used on the host processor.

In some embodiments, the transceivers 13 are provided as RS-485 transceivers, for example, the commercially available SN65HVD82 RS-485 transceiver. In some embodiments, the integrated circuits 20 and 40 are provided as RISC microprocessors, for example, the commercially available AM335x/AM437x/AM57xx or similarly enabled microprocessors.

Although example embodiments of the present work have been described above in detail, this does not limit the scope of the work, which can be practiced in a variety of embodiments.

What is claimed is:

1. A process of operating an integrated circuit comprising:
   monitoring, in logic circuitry separate from host processor circuitry, a transmit data output of a UART for a start bit;

starting a timer in the logic circuitry and selecting a transmit mode output from the logic circuitry upon monitoring a start bit on the transmit data output;

selecting a receive mode output from the logic circuitry upon expiration of the timer;

beginning a delay before the selecting;

monitoring the transmit data output of the UART for another start bit during the delay; and proceeding to the selecting upon expiration of the delay.

2. The process of claim 1 including, upon expiration of the timer, beginning a delay before the selecting.

3. The process of claim 1 including, upon expiration of the timer, beginning a delay before the selecting and monitoring the transmit data output of the UART for another start bit.

4. A process of operating an integrated circuit comprising:

monitoring, in logic circuitry separate from host processor circuitry, a transmit data output of a UART for a start bit;

starting a timer in the logic circuitry and selecting a transmit mode output from the logic circuitry upon monitoring a start bit on the transmit data output;

selecting a receive mode output from the logic circuitry upon expiration of the timer;

beginning a delay before the selecting;

monitoring the transmit data output of the UART for another start bit during the delay; and again starting the timer in the logic circuitry and selecting the transmit mode output from the logic circuitry upon monitoring another start bit on the transmit data output.

\* \* \* \* \*